UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE COMPOUNDS AND MAKING SAME.

1,001,408. Specification of Letters Patent. Patented Aug. 22, 1911.

No Drawing. Application filed May 20, 1911. Serial No. 628,527.

*To all whom it may concern:*

Be it known that I, MAX HENRY ISLER, chemist, citizen of the Swiss Republic, residing at Mannheim, Germany, have invented new and useful Improvements in Anthracene Compounds and Making the Same, of which the following is a specification.

I have found that benzoyl-amino-ortho-halogen-anthraquinone and derivatives thereof can be caused to undergo condensation, whereby a new ring is formed, and compounds are produced which can apparently be regarded as phenanthridons of the anthraquinone series. The condensation is preferably carried out by means of a condensation agent, and the products can be employed as coloring matters or in the production of coloring matters.

The following examples will serve to illustrate further the nature of my invention, which, however, is not confined to these examples. The parts are by weight.

Example 1: Boil together for a few hours fifty parts of 1-benzoyl-amino-2-brom-anthraquinone, fifty parts of naphthalene and ten parts of calcined soda, and then remove the naphthalene by means of toluol or alcohol. The residue can be purified by re-crystallization from ortho-dichlor-benzene, and melts at about from two hundred and sixty-six to two hundred and sixty-seven degrees centigrade. Analysis points to the condensation product possessing the formula

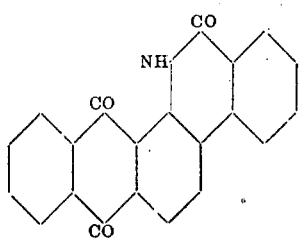

It yields a yellow solution in concentrated sulfuric acid, but it is difficultly soluble in the ordinary solvents.

Example 2: Boil together, for a few hours, fifty parts of 1.4-dibenzoyl-amino-2.3-dichlor-anthraquinone, one hundred parts of naphthalene and twenty parts of calcined soda, and then work up the mixture as described in the foregoing example. The pure product does not melt below three hundred and twenty-five degrees centigrade.

Example 3: Boil together, for from four to five hours, fifty parts of 1-chlor-2-benzoyl-amino-anthraquinone, thirty parts of nitro-benzene and twenty parts of calcined soda or anhydrous sodium acetate, and then work up the mixture as described in the foregoing Example 1. Analysis points to the product possessing a constitution represented by the formula

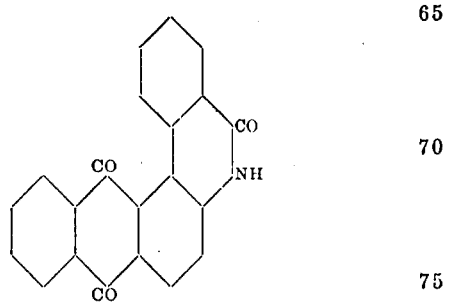

When pure, the product melts at from two hundred and seventy-four to two hundred and seventy-five degrees centigrade.

In a similar manner, a condensation product can be obtained from 2-benzoyl-amino-3-halogen-anthraquinone.

Example 4: Boil together, for a few hours, twenty-three parts of 1.5-dichlor-2.6-dibenzoyl-diamino-anthraquinone (obtainable by boiling 1.5-dichlor-2.6-diamino-anthraquinone with benzoyl chlorid), one hundred and forty parts of naphthalene, nine parts of calcined soda, and seven parts of finely divided copper powder. Work up the product in the manner described in the foregoing Example 1, and re-crystallize the product from nitrobenzene. The pure product does not melt below three hundred and twenty degrees centigrade. Analysis points to its possessing a constitution represented by the formula

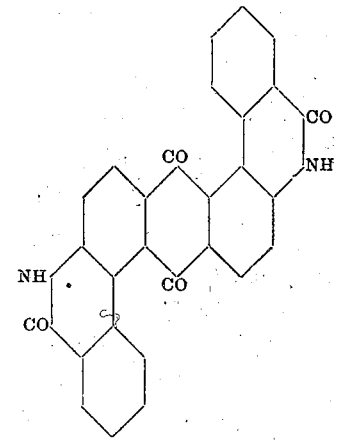

It dyes cotton from a vat yellow.

In a similar manner condensation products can be obtained from other ortho-benzoyl-amino-halogen-anthraquinones; for instance from 1.3.5.7-tetrabrom-2.6-dibenzoyl-diamino-anthraquinone.

Example 5: Boil together, for a few hours, fifty parts of ortho-chlor-benzoyl-amino-ortho-chlor-anthraquinone (obtainable by heating ortho-chlor-benzoyl chlorid with 1-chlor-2-amino-anthraquinone), fifty parts of naphthalene and ten parts of calcined soda, and work up the mixture in the manner described in the foregoing Example 1. The product, when pure, melts at from two hundred and seventy-eight to two hundred and eighty degrees centigrade, and analysis points to its possessing a constitution represented by the formula

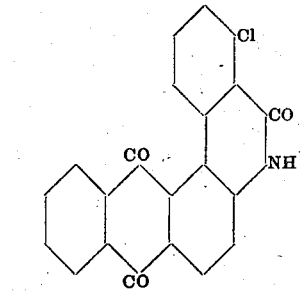

If, in this example, copper powder be present, the other chlorin atom is eliminated and the product described in the foregoing Example 3 is produced.

Now what I claim is:—

1. The process of producing new products of the anthracene series by treating a benzoyl-amino-ortho-halogen-anthraquinone body with a condensation agent.

2. The process of producing a new compound of the anthracene series by treating 1.5-dichlor-2.6-dibenzoyl-diamino-anthraquinone with a condensing agent.

3. As new articles of manufacture the new compounds being phenanthridons of the anthraquinone series which can be obtained by treating a benzoyl-amino-ortho-halogen-anthraquinone body with a condensation agent, which new compounds yield yellow solutions in concentrated sulfuric acid, possess high melting points, and are difficultly soluble in the ordinary solvents.

4. As a new article of manufacture the compound obtainable by treating 1.5-dichlor-2.6-dibenzoyl-diamino-anthraquinone with a condensing agent, which compound possesses a constitution corresponding to the formula

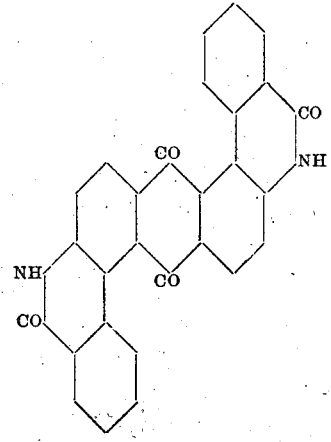

which consists, when dry, of a yellow powder, yields a yellow solution in concentrated sulfuric acid, is difficultly soluble in the ordinary solvents, and dyes cotton from a vat yellow shades.

In testimony whereof I have hereunto set my hand in the presence of two subscribing witnesses.

MAX HENRY ISLER.

Witnesses:
J. ALEC. LLOYD,
A. O. TITTMANN.